United States Patent
Roe et al.

[11] Patent Number: 5,834,381
[45] Date of Patent: Nov. 10, 1998

[54] NON-HALOGENATED TRI-LAMINATE FABRIC FOR AUTOMOTIVE SECURITY SHADES OR COVERS

[75] Inventors: Frank Roe, Greensboro, N.C.; Alex Churchill, Framingham, Mass.; Tom Fabbrini, Winston-Salem, N.C.

[73] Assignee: Highland Industries, Inc., Greensboro, N.C.

[21] Appl. No.: 948,006

[22] Filed: Oct. 9, 1997

[51] Int. Cl.$^6$ ........................................ B60J 11/00
[52] U.S. Cl. .................... 442/41; 296/95.1; 428/68; 442/38; 442/236; 442/261; 442/290; 442/314
[58] Field of Search ................. 442/38, 41, 236, 442/261, 290, 314; 428/68; 296/95.1

[56] References Cited

U.S. PATENT DOCUMENTS

| | | | |
|---|---|---|---|
| 549,021 | 10/1895 | Robischung . | |
| 5,364,704 | 11/1994 | Murchall et al. | 428/516 |
| 5,366,786 | 11/1994 | Connor et al. | 428/171 |
| 5,376,437 | 12/1994 | Kawakami et al. | 428/216 |
| 5,409,286 | 4/1995 | Huang | 296/136 |
| 5,503,903 | 4/1996 | Bainbridge et al. | 428/182 |
| 5,506,020 | 4/1996 | Haberkorn | 428/102 |
| 5,543,206 | 8/1996 | Austin et al. | 428/198 |
| 5,552,185 | 9/1996 | De Keyser | 427/358 |
| 5,567,501 | 10/1996 | Srinivasan et al. | 428/137 |
| 5,607,798 | 3/1997 | Kobylivker et al. | 442/381 |

*Primary Examiner*—James J. Bell
*Attorney, Agent, or Firm*—Rhodes Coats & Bennett L.L.P

[57] ABSTRACT

A non-halogenated, tri-laminate fabric for automotive security shades or covers, comprising a layer of reinforcing fabric scrim juxtapositioned between at least two layers of a thermoplastic olefin film comprised of a rubber modified polyolefin compound, said layers being thermally bonded together to form a fire retardant, nontoxic tri-laminate fabric. The rubber modified polyolefin is a rubber modified polypropylene or polyethylene homopolymer and copolymer. The rubber is natural or synthetic. The preferred thermoplastic olefin film has characteristic melt peaks at temperatures ranging between about 61° C. and 100° C. and between about 105° C. and 168° C., with melt peaks forming preferably at about 86° C. and 142° C. Acceptable thermal lamination of the layers occurs at temperatures ranging between about 120° C. and 140° C.

12 Claims, 3 Drawing Sheets

NON-HALOGENATED TRI-LAMINATE FABRIC FOR AUTOMOTIVE SECURITY SHADES OR COVERS

FIELD OF THE INVENTION

The present invention is directed to a non-halogenated tri-laminate fabric for automotive security shades or covers. More particularly, the present invention is directed to a tri-laminate reinforced fabric scrim interposed between layers of a thermoplastic olefin film.

BACKGROUND OF THE INVENTION

In general, it is known in the fabric construction industry to combine multilayer and/or composite fabrics with resinous coatings or films that are made of various polymeric materials. For example, U.S. Pat. No. 5,567,501 to Srinivasan et al. discloses an apertured non-woven product comprising non-woven fibrous outer layers and an inner polymeric film layer having a lower melt temperature. The layers are thermally bonded together. The outer layer may include polypropylene fibers or polyolefinic fibers, and the film may also be an olefinic material such as polyethylenes. U.S. Pat. No. 5,503,903 to Bainbridge et al. discloses an automotive panel comprising front and back sheets of polypropylene and wood fibers and a corrugated middle sheet, wherein the sheets are heat molded to melt the polypropylene component fibers. U.S. Pat. No. 5,607,798 to Kobylivker at al. discloses a multilayer thermoplastic polymer and non-woven composite fabric, wherein the first layer comprises a non-woven, spunbond fabric, and the at least one middle layer comprises a melt-blown, non-woven film, and the second layer comprises a spunbonded polypropylene layer, wherein the layers are bonded in fixed relation to each other.

Polyvinyl chloride (PVC) films or related halogenated based films are commonly laminated onto knitted fabric scrims that used by the automotive industry in the manufacture of luggage security shades or covers. A urethane coating for gloss, color match, and/or abrasion resistance is commonly applied. While such cover materials are cost effective and easily produced, there are several disadvantages in using these materials. PVC based films have limited durability, tear resistance, and weld strength. In particular, the halogenated or PVC films are extremely resistant to acids, alkalis, and bacteria, and therefor the disposal and/or decomposition is difficult. Even more significantly, such materials are known to be "environmentally unfriendly" because, inter alia, they cannot be incinerated without releasing toxic by-products such as hydrogen chloride gas into the atmosphere. As a result, such films make recycling of these laminate fabrics extremely difficult.

With the shortcomings of existing halogenated laminate fabrics for automotive uses and in view of the negative environmental impact of halogenated materials like PVCs, there exists a need for a non-halogenated or environmentally friendly security shade fabric for automobiles having good flame retardancy, as well as good tear and weld strength properties.

SUMMARY OF THE INVENTION

The present invention is directed to a novel, non-halogenated tri-laminate fabric that is particularly useful in producing high quality, tear resistant, automotive security shades or covers. More specifically, the tri-laminate fabric comprises a layer of reinforcing fabric scrim juxtapositioned between at least two layers of a thermoplastic olefin ("TPO") film comprised of a rubber modified polyolefin compound. All layers are thermally bonded together at pre-selected temperatures to form a fire retardant, non-toxic tri-laminate fabric. The preferred rubber modified polyolefin can be a rubber modified polypropylene or polyethylene homopolymer and copolymer. However, the rubber may be selected from any non-halogenated synthetic or natural rubber, of which EPDM, EVA, acrylic rubber, butadiene rubber, nitrile-butadiene rubbers, styrene-butadiene rubbers, isoprene rubbers, butyl rubbers, nitrile rubbers, polyurethane rubbers, and natural rubber are examples.

The non-halogenated tri-laminate fabric of the present invention has several advantages over prior art PVC film laminate fabrics. First, the tri-laminate fabric performs comparably, and in some instances superiorly, without the negative environmental impact associated with PVCs (e.g., release of hazardous by-products during manufacturing and toxins produced during combustion such as disposal by incineration). Second, the tri-laminate fabric demonstrated superior tear and weld strength as well as acceptable flexibility. Third, the tri-laminate fabric does not require a top coating like PVC film based laminates to combat abrasion resistance. Additionally, in contrast to PVC the tri-laminate fabric retains its grain configuration at higher temperatures (up to 110° C.) and realizes a more "leatherlike feel".

In producing the tri-laminate fabric of the present invention, a first layer of a non-halogenated thermoplastic olefin film is applied to a hot drum where the film is continuously heated at pre-selected temperatures. Next, a layer of knit or woven scrim (reinforced fabric) of polyester, nylon or other materials is applied onto the first layer of film concurrently with a second layer of the thermoplastic olefin film. All layers are then pressed together using nip rolls, and optimal thermal sealing or lamination of the two film layers around the fabric scrim layer occurs at temperatures ranging between about 120° C. and 140° C. The resulting product, a tri-laminate fabric, is then cooled and taken up in roll form. Optionally, the tri-laminate fabric may be embossed to impart texture to the final fabric during the first pass of the various layers through the process. In the alternative, the tri-laminate fabric may be re-heated during a second pass of the fabric through the process to emboss the fabric.

Such fabrics are used in the production of automotive security shades or covers. These covers include, but are not limited to, automotive luggage compartment covers, automobile and/or truck tarps or any other applications requiring similar specifications.

The preceding and further objects of the present invention will be appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

Figure 1:
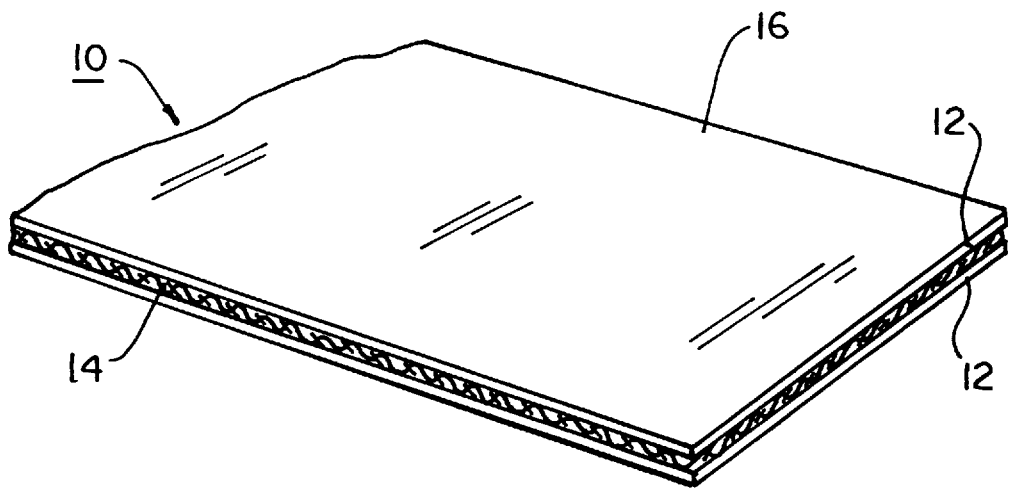
FIG. 1 is a side cross-sectional view of the non-halogenated tri-laminate fabric of the present invention.
Figure 2:
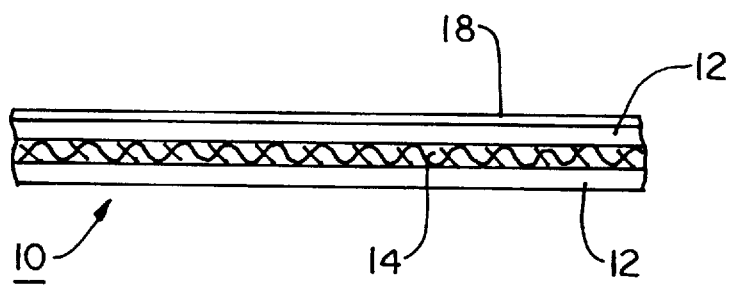
FIG. 2 is a cross section of the non-halogenated tri-laminate fabric of the present invention.

According to the present invention, a non-halogenated tri-laminate fabric for automotive security shades or covers is provided, and is generally denoted by the numeral 10. Referring to FIGS. 1 and 2, fabric 10 is a laminate formed of a top or first layer of a thermoplastic olefin film 12 comprised of a rubber modified polyolefin compound, a second (middle) layer of reinforcing fabric scrim 14, and a bottom or third layer of the thermoplastic olefin film 12 having the same composition and thickness as the first film layer. Films 12 may vary in thickness, however, in a symmetrical construction, the films should be in the range of 8–12 mils thick, while in a asymmetrical construction, the thickness may range from 3–15 mils. The fabric scrim 14 is juxtapositioned between the two thermoplastic olefin film layers 12. The thermoplastic olefin films 12 and fabric 14 are thermally bonded together at sufficient temperatures to form a fire retardant, non-toxic tri-laminate fabric 10 that is approximately 21 mils thick or less. The thinner the fabric 10, the greater its suppleness or hand. A pattern may be embossed onto the technical face of fabric 10 to provide a textured configuration to the fabric. A topcoat 18, in the form of a methane coating, may be added to fabric 10. The topcoat typically functions to control gloss and/or resist potential abrasion.

Figure 4:
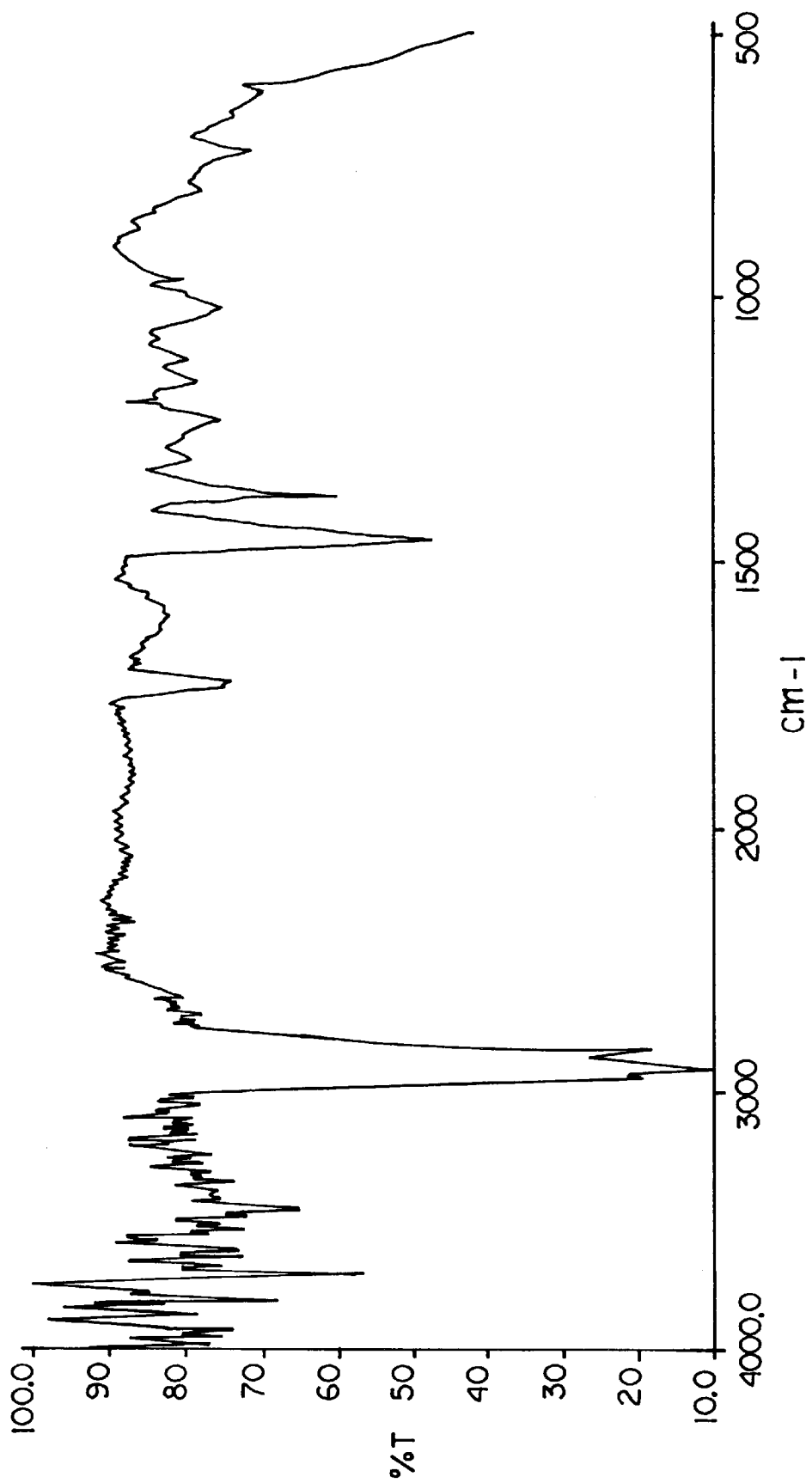
FIG. 4 is an infrared (IR) spectrum analysis of the preferred thermoplastic olefin film.

The thermoplastic olefin films 12 that were used in the present invention are manufactured by O'Sullivan Corporation (Winchester, Va.) and identified as Product "TH". The infrared spectrum analysis of this film is illustrated in FIG. 4. The films 12 are compounded from a rubber modified polyolefin, in particular a rubber modified polypropylene or polyethylene homopolymer and copolymer. In addition to the rubber modified polyolefin, the films 12 typically include flame retardants, thermal stabilizers, biocides, pigments, and inorganic fillers. A differential scanning calorimeter was used to determine the amount of energy required to heat fabric 10. Test results revealed that the thermoplastic olefin films 12 exhibit characteristic melt peaks at temperatures ranging between about 61° C. and 100° C. and between about 105° C. and 168° C., with melt peaks forming preferably at around 86° C. and approximately 142° C. The films 12 were selected to provide the desired characteristics of flame retardancy, improved weld and tear strengths, elasticity, and environmental friendliness to the finished product.

Fabric scrim 14 is preferably produced on a conventional warp knit, weft inserted knitting machine, however, the fabric may also be constructed using very open woven fabric to allow for sufficient penetration of the thermoplastic olefin films. In the preferred fabric scrim, the warp yarns are made of polyester having a denier of between about 70 and about 2000 depending on the strength required. The weft yarns are also constructed of polyester yarns having a denier between about 70 and about 1500. The stitching yarns are made of polyester having a denier about 20 and about 200. Currently, automobile manufacturers require a product having a strength that is met by use of a fabric having a 18×12 threads per inch with warp yarns of a denier of 220 and weft yarns of a denier of 500.

Figure 3:
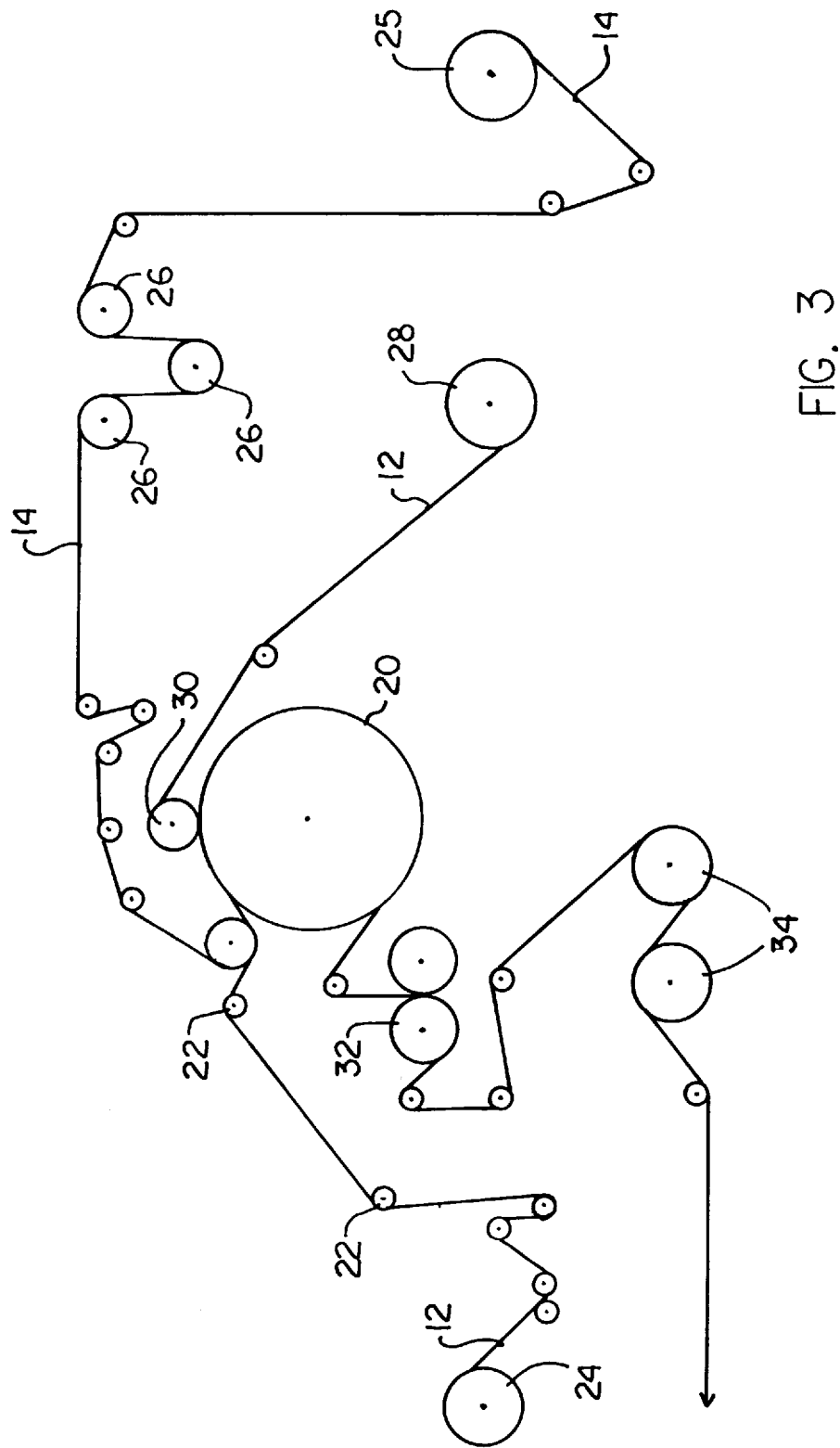
FIG. 3 is a schematic view of an apparatus for carrying out a first pass for producing the non-halogenated tri-laminate fabric of the present invention.

Referring to FIG. 3, tri-laminate fabric 10 was produced on a conventional laminator in the following manner. A first top layer of a thermoplastic olefin film 12 is delivered by a series of rollers to a heated drum 20. During this passage, the film 12 is prevented from wrinkling by expander rolls 22 where the film is laid onto. The first layer of film 12 is drawn from roller 24 and laid onto heated drum 20 without any pressure being applied to the film. The temperature of the heated drum 20 is maintained at approximately 300° F. during this process. Next, fabric scrim 14 is delivered by a series of rollers to the steam drum 20. A series of rollers 26 function to maintain the appropriate tension on fabric scrim 14 as it is being delivered to the drum 20. Fabric scrim 14 is drawn from roller 25 and laid on top of the first layer of thermoplastic olefin film 12, which is positioned on drum 20. Concurrently with the delivery of fabric scrim 14 to drum 20, a second layer of thermoplastic olefin film 12 is released from roller 28 and delivered to steam drum 20 by way of a top nip roller 30. Simultaneously with the application of the second layer of film 12 onto fabric scrim 14, the top nip roller exerts sufficiently high pressure on the combined two layers of film 12 with the layer of fabric scrim 14 juxtapositioned between them, resulting in the formation of a laminate fabric 10.

The surface temperature of the laminated fabric may vary depending on the specification of the thermoplastic olefin film selected. In the embodiment described, the O'Sullivan TH product was of film having a thickness of 10 mils. With this construction, acceptable lamination was achieved when the fabric surface reached temperatures ranging between about 120° C. and 140° C.

Next, texture or a pattern such as a "Sierra" grain was applied to fabric 10. To achieve this pattern, the fabric 10 was passed over an embossing roller 32, which was a temperature of about −10° C. Acceptable embossing of the "TH" product occurs with a surface temperature of 135°–140° C. Again, embossing temperature is dependent on time, temperature, and the specific film used. The embossed laminate fabric 10 was further cooled by passage over a series of cooling cans 34. The laminated fabric 10 processed well during the emboss pass.

While the embossing step is preferably done during a single pass in combination with the lamination, it may be performed as a second separate operation. In the latter process, laminated fabric 10 may be subsequently re-heated in order to soften the fabric, and then embossed with a desired pattern. It should be noted that the laminated fabric 10 appears to retain the pattern at higher temperatures (up to 110° C.) than prior art fabrics laminated with PVC based films.

Using the lamination process specifications described above, comparison testing was conducted to analyze the differences, if any, between the non-halogenated laminated fabric of the present invention and prior art laminate fabrics containing PVC based films. A summary of the test results are shown below in Table 1. As shown, laminate fabric 10 met all the physical performance requirements of Honda Engineering Standard (HES) -D-6511-85, which is the most rigorous of the acceptable automotive standards.

TABLE 1

COMPARISON OF TPO AND PVC SECURITY SHADE FABRICS
TEST METHOD HES-D-6511-85

| ITEM/TEST METHOD | UNITS | TARGET | TPO | PVC |
|---|---|---|---|---|
| WEIGHT | g/m² | TBD | 517 | 455 |
| TENSILE STRENGTH | | | | |
| WARP | | >15 | 17.3 | 18.5 |
| FILL | kgf/cm | >10 | 11.7 | 12.8 |
| ELONGATION | mm | | | |
| WARP | | <25 | 22 | 13.7 |
| FILL | | <35 | 41 | 11.3 |
| TEAR STRENGTH | kgf | | | |
| WARP | | >4.5 | 16.1 | 9.1 |
| FILL | | >4.5 | 21.1 | 9.5 |
| PEEL STRENGTH | | | | |
| ASTM D413 | kgf/cm | | | |
| WARP | | >0.8 | Will Not Separate | Will Not Separate |
| FILL | | >0.8 | Will Not Separate | Will Not Separate |
| IMPACT | Height (cm) | >60 | PASS | PASS |
| STRENGTH | Weight (kg) | >0.5 | PASS | PASS |
| GAUGE | mils | TBD | 21.3 | 15.0 |
| SAE J882 | | | | |
| CREASE FLEX | NONE | No Abnormalities | PASS | PASS |
| WARP | | After 1500 Cycles | | |
| FILL | | | | |
| TABER | NONE | MET AGREED | 5 | 5 |
| ABRASION | | | | |
| ASTM D1175 | | UPON STANDARD | 5 | 5 |
| DRY CROCKING | | ≥4 | 4–5 | 5 |
| "AATCC SCALE" | | | | |
| WET CROCKING | | ≥4 | 4–5 | 5 |
| "AATCC SCALE" | | | | |
| BLOCKING | Record Result | No Abnormalities | PASS | PASS |
| SAE J912 | | | | |
| COLD CRACK | Record Result | No Cracks @30° C. | PASS | PASS |
| ASTM D2136 | | | | |
| ALKALI | Record Result | No Abnormalities | PASS | PASS |
| RESISTANCE | | | | |
| HYDROGEN | | | | |
| SULFIDE | | | | |
| RESISTANCE | Record Result | No Abnormalities | PASS | PASS |
| WARP | | <4 | 1.5 | 0.2 |
| FILL | | <4 | 0.2 | 0.0 |
| WATER | | | | |
| SHRINKAGE | % | | | |
| WARP | | <2 | 0.0 | 0.0 |
| FILL | | <2 | 0.0 | 0.0 |
| FLAMMABILITY | mm/min | | | |
| HES D 6003-089 | | | | |
| WARP | | <81 | 64 | 51 |
| FILL | | <81 | 43 | 38 |
| FOGGING | % | >60 | 70 | 61.7 |
| SAE J 275 | | | | |
| or equivalent | | | | |
| VOLATILITY | | | | |
| LOSS | % | | | |
| 5 Hours @ 100° C. | | <4 | 0.21 | 0.60 |
| 100 Hours @ 120° C. | | <5 | 0.41 | 0.74 |
| 400 Hours @ 120° C. | | <15 | 2.50 | 0.84 |
| WELD STRENGTH | | | | |
| GME 60-347 | N/4 mm | @110° C. | | |
| WARP | | >8 | 26 | 17 |
| FILL | | >8 | 32 | 16 |
| STITCH | | | Fabric tore | |
| STRENGTH | kgf | | before seam | |
| WARP | | >50 | 68.58 | 54.8 |
| FILL | | >50 | 22.11 | 55.9 |
| FIXED LOAD | | | | |
| ELONGATION | % | | | |
| WARP | | <5.0 | 4.3 | 3.0 |
| FILL | | <10.0 | 7.3 | 2.0 |
| SET LOAD | | | | |

TABLE 1-continued

COMPARISON OF TPO AND PVC SECURITY SHADE FABRICS
TEST METHOD HES-D-6511-85

| ITEM/TEST METHOD | UNITS | TARGET | TPO | PVC |
|---|---|---|---|---|
| ELONGATION | % | | | |
| WARP | | <1.0 | 2.3 | 0.0 |
| FILL | | <2.0 | 3.3 | 0.0 |
| 60° GLOSS | | | | |
| ASTM D2457 | % | BLACK 1.1 | 3.9 | N/A |
| | | GRAY 1.3 | | N/A |
| HEAT RESISTANCE | JIS GRAY | | | |
| 500 HOURS @ 90° | SCALE | >4 | 4–5 | 4 |
| HEAT AGING RESISTANCE | | | | |
| TENSILE STRENGTH | kg/cm | | | |
| WARP | | >12.0 | 15.7 | 16.7 |
| FILL | | >8.0 | 9.6 | 13.1 |
| TEAR STRENGTH | kgf | | | |
| WARP | | >3.5 | 19.5 | 8.6 |
| FILL | | >3.5 | 20.4 | 8.3 |
| COLD RESISTANCE | | | | |
| –15° C. | NONE | NO CRACKS | NO CRACKS | NO CRACKS |
| LIGHT AGING RESISTANCE | | | | |
| TENSILE STRENGTH | kg/cm | | | |
| WARP | | >12.0 | 21.1 | 16.2 |
| FILL | | >8.0 | 9.6 | 13.1 |
| TEAR STRENGTH | kfg | | | |
| WARP | | >3.5 | 14.3 | 9.8 |
| FILL | | >3.5 | 11.7 | 9.1 |
| COLD RESISTANCE | NONE | NO CRACKS | NO CRACKS | NO CRACKS |
| APPEARANCE | JIS GRAY | >4 | 4 | SCALE |

The results, shown above in Table 1, demonstrate that the overall superior properties of fabric 10 over the prior art fabric. This is evident from the greater tear strength value obtained for fabric 10. Such strength allows fabric 10 to have greater stability and resistance over time. Second, the weld strength of fabric 110° C. is approximately 1.5–2 times greater than the PVC laminated fabric. Third, fabric 10 meets or exceeds standard flammability requirements for automotive interior components.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

All references disclosed herein are incorporated by reference in their entirety.

What is claimed:

1. A non-halogenated tri-laminate fabric for automotive security shades or covers, comprising a layer of reinforcing fabric scrim juxtapositioned between at least two layers of a thermoplastic olefin film, said film comprised of a non-halogenated rubber modified polyolefin compound, said layers being thermally bonded together to form a fire retardant, non-toxic tri-laminate fabric.

2. The non-halogenated tri-laminate fabric according to claim 1, wherein said rubber modified polyolefin is a rubber modified polypropylene homopolymer and copolymer.

3. The non-halogenated tri-laminate fabric according to claim 1, wherein said rubber modified polyolefin is a rubber modified polyethylene homopolymer and copolymer.

4. The non-halogenated tri-laminate fabric according to claim 1, wherein said rubber is selected from the group consisting of EPDM, EVA, natural rubber, acrylic rubber, butadiene rubber, nitrile-butadiene rubber, styrene-butadiene rubber, isoprene rubber, butyl rubber, nitrile rubber, polyurethane rubber, and natural rubber.

5. The non-halogenated tri-laminate fabric according to claim 1, wherein said thermoplastic olefin film has characteristic melt peaks at temperatures ranging between about 61° C. and 100° C. and between about 105 ° C. and 168° C., with melt peaks forming preferably at about 86° C. and 142° C.

6. The non-halogenated tri-laminate fabric according to claim 1, wherein said layers are thermally bonded together at temperatures ranging between about 120° C. and 140° C.

7. The non-halogenated tri-laminate fabric according to claim 1, wherein said layer of reinforcing fabric scrim is woven or knit.

8. An automotive security shade or cover comprising the non-halogenated tri-laminate fabric of claim 1.

9. A non-halogenated tri-laminate fabric for automotive security shades or covers, comprising a layer of reinforcing fabric scrim juxtapositioned between at least two layers of a thermoplastic olefin film comprised of a rubber modified polyolefin compound, said layers being thermally bonded together to form a tri-laminate fabric and said thermoplastic olefin film, said film having characteristic melt peaks at temperatures ranging between about 61° C. and 100° C. and between about 105° C. and 168° C., with melt peaks forming preferably at about 86° C. and 142° C.

10. The non-halogenated tri-laminate fabric according to claim 9, wherein said rubber modified polyolefin is a rubber modified polypropylene homopolymer and copolymer.

11. The non-halogenated tri-laminate fabric according to claim 9, wherein said rubber modified polyolefin is a rubber modified polyethylene homopolymer and copolymer.

12. The non-halogenated tri-laminate fabric according to claim 9, wherein rubber is selected from the group consisting of EPDM, EVA, natural rubber, acrylic rubber, butadiene rubber, nitrile-butadiene rubber, styrene-butadiene rubber, isoprene rubber, butyl rubber, nitrile rubber, polyurethane rubber, and natural rubber.

* * * * *